United States Patent [19]

DiGioia et al.

[11] 4,016,318
[45] Apr. 5, 1977

[54] AUTOMOTIVE CARPET MAT AND METHOD OF PREPARING SAME

[75] Inventors: Frank A. DiGioia; Timothy W. Brown, both of Dalton, Ga.

[73] Assignee: General Latex and Chemical Corporation, Cambridge, Mass.

[22] Filed: July 16, 1976

[21] Appl. No.: 705,771

[52] U.S. Cl. .................................. 428/95; 156/72; 156/242; 156/245; 428/215; 428/216; 428/218; 428/310; 428/315; 428/425

[51] Int. Cl.² .................. D03D 27/00; D04H 11/00

[58] Field of Search ............ 428/95, 215, 216, 218, 428/310, 315, 425; 156/72, 148, 247, 242, 243, 244, 245; 264/50

[56] References Cited
UNITED STATES PATENTS

| 3,703,424 | 11/1972 | Charnock | 428/88 |
| 3,926,700 | 12/1975 | Hopkins | 428/95 |
| 3,953,632 | 4/1976 | Robinson | 428/95 |

*Primary Examiner*—Marion E. McCamish
*Attorney, Agent, or Firm*—Richard P. Crowley

[57] ABSTRACT

A moldable tufted carpet automobile mat, the molded mat and the process of preparing the mat, the moldable automobile mat comprising in combination: a tufted carpet having a tufted face surface and a back surface; a thin layer of a stiff, heat-moldable thermoplastic urethane resin having a thickness of up to about one-eighth of an inch, the layer bonded to the back surface of the carpet to secure the tufts to the carpet; and a thick layer of a flexible, cross-linked, thermoset, elastomeric, urethane resin secured to the stiff thermoplastic urethane resin layer, the elastomeric layer having a thickness from about one-eighth of an inch to about three-eighths of an inch.

17 Claims, 3 Drawing Figures

AUTOMOTIVE CARPET MAT AND METHOD OF PREPARING SAME

BACKGROUND OF THE INVENTION

Automobile mats used for covering the flooring of an automobile are typically molded laminated products, and often are composed of a tufted carpet which has a felt or heavy jute padding laminated to the back surface thereof by the use of a hot-melt thermoplastic adhesive. Automobile mats so prepared are heated and molded prior to use to form a molded automobile mat of a molded stiff form, for example, wherein the mat will fit over the transmission hump on the floor of the automobile, and which mat has open areas cut for the accelerator and brake pedals, so that the molded laminated automobile mat may be easily inserted onto the floor of an automobile.

Automobile mats prepared with the use of felt and heavy jute padding as a backing are not wholly satisfactory, since both felt and jute are often imported, and the deliveries and qualities of these materials suffer wide variations. In addition, felt and jute tend to absorb water, and further felt paddings are difficult to be molded, so that they often must be precut prior to the laminating step.

A typical process for the preparation of a tufted carpet automobile carpet mat would comprise the sprinkling of a relatively uniform coating of a hot-melt adhesive material, such as polyethylene or a modified polyethylene material in flake or pellet form, onto the back surface of a roll of tufted carpet. The coated carpet is then introduced into and sent through an oven or under infrared heaters, and the hot-melt material melted for a time to coat the back surface of the carpet. The carpet and hot-melt adhesive are then cooled, cut to size and stacked. The hot-melt adhesive serves as a means to anchor the tufts of the carpet where the face surface of the automobile mat has a tufted carpet, and in addition serves later to laminate a precut felt pad to the back surface of the carpet. At room temperature of 60° to 80° F or slight above; e.g., up to about 100° F, the hot-melt adhesive imparts a stiff form to the automobile mat. When an automobile mat is to be prepared, precut felt padding material is placed into a mold, the hot-melt surface on the coated carpet is then heated up to soften the surface, such as by the use of a hot-air oven or by radiant infrared heaters, and then placed into the mold. The mold, while the hot-melt adhesive is temperature-moldable, forms the carpet and padding to the desired shape. Where the carpet is sufficiently pliable by preheating, the carpet may be cold-molded, and then the molded automobile mat removed and stored, nested together ready for shipment or use.

It is desirable to prepare automobile mats without the use of felt or jute padding, and without the use of precutting of such padding, and to prepare such mats on a production basis. In addition, it would be most advantageous to prepare an automobile mat with better cushioning and sound-deadening and bulk and mobility characteristics than the prior-art automobile mats.

SUMMARY OF THE INVENTION

Our invention relates to an improved laminate product, such as a moldable automobile mat having a thermoplastic moldable urethane resin layer and a flexible urethane resin backing layer, to the method of preparing such an improved automobile mat and to the molded automobile mat produced thereby. In particular, our invention relates to an improved tufted carpet, moldable automobile mat having a thin, stiff, thermoplastic, urethane resin layer and a thicker thermoset, elastomeric, urethane resin, flexible, backing layer, to the method of preparing such mat and to the molded mat prepared thereby.

Our laminate material comprises a sheet material, such as a tufted carpet, wherein a fibrous material is tufted or otherwise inserted into or secured to a sheet scrim material to form a fibrous face surface material and a back surface, a layer of a thermoplastic urethane resin bonded to the back surface of the sheet, and a layer of a flexible thermoset urethane resin bonded to the thermoplastic urethane resin layer.

In particular, our laminate product employs a tufted carpet layer wherein natural or synthetic or a combination of fibers are tufted into a sheet scrim material to present a tufted fibrous face surface, with the laminate product with such face surface designed, for example, to be used as a molded automobile floor covering or other molded floor-covering surface. Typically, the face surface is molded or otherwise contoured and cut in size to fit into the designated space and floor contour arrangement of the particular automobile in which the carpet is designed for use.

A layer of a thermoplastic urethane resin, such as a precoat layer, is applied to the back surface of the tufted carpet layer in an amount sufficient to secure the back of the fibers to the back surface of the scrim material, and in an amount to serve as a moldable thermoplastic layer. The thermoplastic urethane layer typically ranges up to about one eighth of an inch; for example, about one thirty second to one sixteenth of an inch in thickness. The thermoplastic urethane resin is compounded to exhibit thermoplastic physical properties so that, when the compound is heated to over about 150° F; for example, in a range from about 150° to 200° F; e.g., 170° to 190° F, the thermoplastic layer becomes pliable and soft and is adapted to be molded and formed to the desired shape.

The thermoplastic urethane resin should be returned to its original hardness when cooled to temperatures below about 100° F; for example, room temperatures of 60° to 85° F, and to conform then to the molded shape desired in use. A thermoplastic urethane resin layer of this type is particularly valuable and useful in preparing carpet automobile mats, so that the tufted carpet with the thermoplastic urethane resin layer heated to a moldable temperature may be heat- or cold-pressure-molded; that is, with heat and pressure, or both, to the desired shape, such as the shape to form over the contours of the automobile floor.

The flexible urethane resin employed as the backing layer of our laminate typically is thicker than the thermoplastic urethane resin layer; for example, up to about three-eighths of an inch in thickness; for example, about one-eighth to three-sixteenths of an inch in thickness. The flexible urethane resin layer may be a solid, blown or a frothed elastomeric urethane, with the foam layer usually having a high foam density; e.g., over 25 pcf; e.g., 30 to 45 pcf. The layer is formulated so that the flexible layer provides for high density and good sound absorption when employed in a molded automobile carpet mat. The unique combination of the thermoplastic layer and the flexible urethane resin layer provides for both heat-conforming qualities and sound-deadening and density qualities in an automobile mat.

The flexible urethane resin layer comprises an elastomeric flexible thermoset urethane resin, and may be employed as a solid layer or as a chemically blown or frothed foam layer, and which resin compositions are of a type well-known in the art. Such resin compositions may have the usual additives, and typically are composed of isocyanate materials, such as an aromatic diisocyanate, such as polyphenyl polymethylene polyisocyanate; e.g., a diphenylmethane diisocyanate present in a crude MDI-reaction mixture, reacted together with suitable polyols, such as vinyl-capped polymeric polyols like styrene-capped polymers, alone or in combination with other polyols, such as polyether polyols derived from the reaction of polyfunctional alcohols with propylene and/or with ethylene oxides. Other additives may be used, such as a catalyst like an organo-metal catalyst or amines, water-scavenging agents, such as molecular sieves, calcium sulfate and the like, plasticizers, fillers, flame retardants, pigments, blowing agents, surfactants, amines, such as tertiary amine, silicones, and other additives and modifiers typically employed in the preparation of flexible urethane thermoset solvent foam layers.

The thermoplastic resin layer of our laminate product may comprise any thermoplastic urethane resin which is moldable; for example, above 150° F, and suitable for the purposes of preparing a moldable automobile mat. Such thermoplastic urethane resins typically comprise a long-chain polymer with minimized cross-linking. Suitable and typical urethane thermoplastic resins, based upon the employment of aliphatic polyisocyanates, are well-known and are described, for example, in *Polyurethanes: Chemistry and Technology*, Sanders and Frisch, Interscience Publishing Co., 1964, Vol. 2, pages 379–409, herein incorporated by reference.

A particular and unique thermoplastic urethane resin suitable for use in preparing our laminate product comprises a thermoplastic urethane resin which is based upon the employment of an aromatic isocyanate, rather than the use of conventional and much higher cost aliphatic isocyanates which are employed with present thermoplastic urethane resin compositions. The unique aromatic thermoplastic urethane resin composition employs an aromatic polyisocyanate, such as a crude MDI-reaction mixture with polyol or modified polyol in such a manner such as to have a deficiency of NCO groups per OH group; that is, sufficient isocyanate is employed so as to provide an NCO/OH ratio of about 0.67 NCO per 1 OH group. Then the prepolymer with the free hydroxyl terminal groups of the polyol is reacted with a reactive silicone compound, such as a siloxane compound, particularly of a polymeric siloxane compound.

The reaction is typically carried out without a catalyst and is essentially free of an amino or organo tin catalyst to produce a long-chain polymer. Although some amine catalysts may be present as an impurity in minor amounts of the components employed, the unique urethane composition provides for a long-chain polymer with a minimum of cross-linking. The slight deficiency in the polyisocyanate prevents the aromatic-based urethane from becoming too rigid after reaction of the prepolymer; that is, the aromatic polyisocyanate and the polyol. In connection with such unique aromatic-based thermoplastic urethane resins, a water-scavenging agent is employed or means taken to prevent the presence of water in the mixture, so as to prevent or inhibit the reaction of the water with the NCO groups to form urea and biuret groups. The presence of water provides for a much inferior compound with very weak heat strength and low thermoplasticity strength. Therefore, it is essential in such formulations to employ not only the deficiency in NCO groups with a polyol, together with a reactive silicone, but also to employ very low, for example, under 0.1% by weight of any amine or organo tin or other catalyst, and to employ in such formulation a water-scavenging agent, or use other means to avoid moisture in the mixture.

The aromatic polyisocyanates usefully employed in preparing the unique thermoplastic urethane resin is comprised of polyaryl, polyalkylene, polyisocyanate, such as, for example, the polyphenyl polymethylene polyisocyanates, and more particularly the di or triphenyl polymethylene di or triisocyanates, to provide a slight deficiency in the NCO groups and the reaction mixture with a polyol, such as, for example, a NCO/OH ratio of 0.5/1 or greater. The aromatic polyisocyanates may be derived, for example, from the well-known, widely used crude MDI-reaction mixtures.

The aromatic polyisocyanates are reacted with polyols, for example, polyethers, such as those formed by the reaction of a polyfunctional alcohol with a propylene and/or with ethylene oxides, alone or in combination with other polyols. Suitable polyphenyl methylene polyisocyanates as the aromatic isocyanate thermoplastic urethane resin compositions and suitable polyhydric polyelkylene ether compounds and polyols suitable for use with the polyisocyanate are set forth in the example in U.S. Pat. No. 3,936,483, herein incorporated by reference.

In the thermoplastic urethane, the excess of hydroxyl groups is tied up or reacted to prevent further cross-linking to obtain a thermoplastic urethane resin based on the aromatic polyisocyanates by reaction with siloxane compounds. Such silicone compounds include polydialkylene siloxanes, such as polydimethyl siloxanes; for example, liquid polysiloxanes which are liquids having a viscosity between about 10 and 400 centipoise at 25° C, or with alkyl silane polysiloxane, polyoxyalkylene block copolymers, such as those copolymers described in U.S. Pat. No. 2,834,748, hereby incorporated by reference. The latter silicone polymers are often employed as foam stabilizers in urethane resins.

The excess hydroxyl groups in the polyol polyisocyanate prepolymer are reacted with the silicone compound which prevents further cross-linking and provides for a chain-extended polymer which is thermoplastic in nature. In addition, the employment of a silicone polymer provides for a slicker appearance of the thermoplastic resin layer, and provides a means to keep any cells forming in the solid thermoplastic resin layer from becoming too large so that such cells remain microcellular. Further, the silicone also acts as a release compound in that it aids in the release of the thermoplastic urethane resin layer from a surface, such as a carrier belt or mold.

Water must be removed from all components of the composition prior to reaction, or more typically a water-scavenging agent is employed, such as finely divided particulate water-scavenging additives which react with or tie up free water or moisture present in the reaction mixture. Sufficient water-scavenging additives should be added and in excess to react with, remove or tie up by chelation or otherwise the free water or moisture which may react with the polyisocyanate, such as, for example, from about 0.1 to 2% by weight of a dehydrating agent, such as calcium sulfate, or more particularly dehydrated and natural and synthetic molecular sieve particles. Optional additives which may be employed with the thermoplastic urethane resin composition would include minor amounts, for example, 1 to 10% by weight of plasticizers to soften the thermoplastic resin and to reduce any brittleness in he thermoplastic resin, as well as thickening agents to increase the viscosity and surface tension, surfactants as well as pigments and fillers, such as carbon black, titanium dioxide, clays, calcium carbonate, vermiculite and the like.

In summary, one unique thermoplastic urethane polymer which may be employed as the thermoplastic layer in our laminate product would be a composition which consists essentially of a polyphenyl methylene polyisocyanante, such as a diphenylene methylene di-isocyanate; a polyol having a functionality, for example, of two or three; for example, a propylene oxide or ethylene oxide or combinations thereof, or polyether in an amount in excess to react with the polyisocyanate and to provide an NCO/OH ratio of about 0.67/1; a reactive silicone compound in an amount sufficient to react with the excess hydroxyl groups of the prepolymer formed; and a water-scavenging agent in an amount sufficient to prevent any water or moisture in the composition from reacting with the polyisocyanate. The thermoplastic urethane formulation is prepared by reacting a portion of the polyol with the polyisocyanate to yield a prepolymer, with the prepolymer reacting with the rest of the materials in the formulation, with the two components then mixed together as to provide for the deficiency of NCO/OH, the reaction being carried out, for example, at a temperature of from about 200° to 350° F. When reacted to its full state, the urethane resin exhibits thermoplastic physical properties, so that the material, when heated to approximately 180° to 200° F, becomes quite pliable and soft. When the urethane resin is cooled to a temperature of 60° to 80° F, it achieves its original hardness and forms to the shape to which it was molded while it was heated. This urethane resin can be heated and cooled repeatedly an infinite number of times with the same results without any substantial loss in plasticity or strength. Thus, this unique thermoplastic resin is suitable for use as a thermoplastic layer in our laminate products or for other uses where a low-cost thermoplastic urethane resin is desired.

DESCRIPTION OF THE EMBODIMENTS

Figure 1:
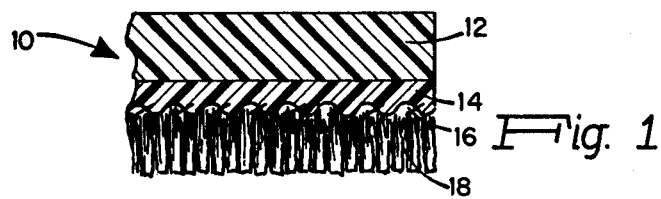
FIG. 1 is a schematic representative cross-sectional view of the laminate product of our invention.

FIG. 1 shows a laminate 10, such as an automobile tufted carpet mat, which comprises a solid layer of approximately one-fourth of an inch of a flexible thermoset urethane resin 12 as the backing layer, and thermoplastic urethane resin layer 14 about one-eighth of an inch secured to a scrim sheet 16, such as a jute sheet or a polypropylene sheet through which fibrous tufts 18, such as of natural and synthetic fibers; e.g., wool, nylon, acrylic polyester or blends thereof, are tufted. The thermoplastic urethane resin layer 14 cures the back surface of the tufts 18 to the scrim sheet 16, and at temperatures up to about 150° F is a rigid, heat-moldable material and conforms to the shape of the automobile floor, while the flexible urethane resin layer 12 forms a high-density sound-absorbing layer.

Figure 2A:
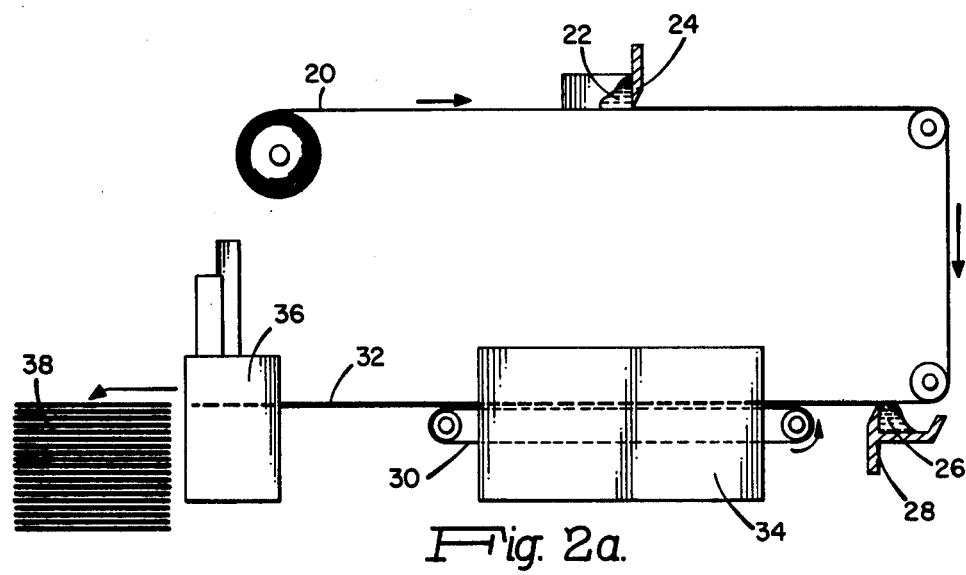
FIG. 2 is a schematic representation and illustration of the process of producing a tufted carpet automobile mat of our invention.

FIG. 2a is directed toward a schematic process illustration of the formation of the laminate product 10 suitable for subsequent molding into an automobile mat of the invention. As illustrated, a tufted carpet 20 is coated with a thermoplastic urethane resin 22 composition by any coating means, such as knife coater, 24 and, thereafter, the precoating of the thermoplastic urethane resin is overcoated with a flexible elastomeric urethane resin composition 26 with a knife coater 28. The coated carpet on a conveyer belt 30, such as fiberglass conveyor belt, with the flexible resin coating adjacent the surface of the conveyor belt, is sent through a curing oven 34; for example, at a temperature of about 240° to 325° F; for example, 250° to 275° F, to cure and react the urethane resins, and to provide the continuous production of a precoated and coated tufted carpet product 32. The tufted carpet product is sent through a cutting station 36 wherein the carpet is cut into a laminate of the desired size and shape, and, thereafter, the laminate is stacked in storage area 38 for subsequent molding into an automobile mat, the laminate product at this stage being essentially flat.

Figure 2B:
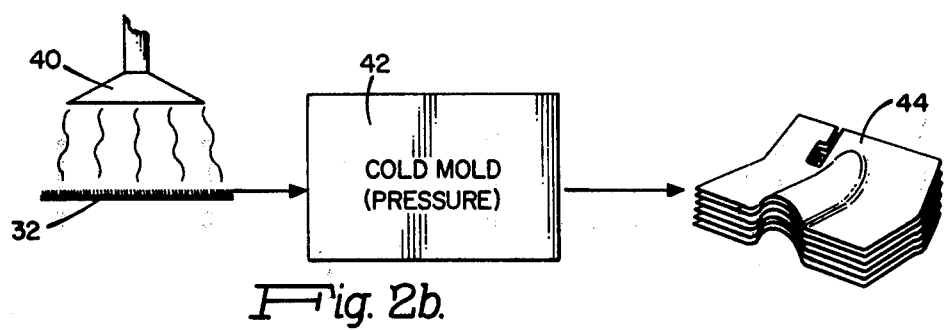

FIG. 2b is a schematic illustration of subsequent processing of carpet 32 wherein the flat cold laminate product is removed from storage, and the back surface thereof is subjected to a radiant heater 40, such as infrared heat, to a temperature of about 160° to 180° F, so as to render the thermoplastic resin layer heat-moldable. Of course, the laminate product may be accomplished in a typical hot-air oven or by other means. The hot moldable laminate product is then placed in a mold 42 of the desired full configuration of the automobile and cold-molded under pressure to form a moldable automobile mat 44 which may then be stacked for storage for subsequent insertion into an automobile. The automobile mat so produced avoids many of the disadvantages of the prior art and produces a superior and improved automobile mat which retains its shape and which also provides good sound-absorption properties and carpet density at a low-cost, while providing for production techniques in the production of the mat.

The thermoplastic urethane resin used in the above process is prepared, using a unique formulation and method. The compound is a thermoplastic urethane using a polymeric methylene diisocyanate as the activator. The resin component consists of a base polyol having an average molecular weight of 4800 and a functionality of three. The cross-linking substances are a hydroxypropyl aniline-reinforcing polyol having a molecular weight of 209 and a functionality of two, and a sorbitol-based rigid polyol having an OH of approximately 490. Dioctyl phthalate is used as a plasticizer to soften the compound and reduce brittleness. A functional silicone is utilized to react with the excess OH groups. A water scavenger is used to control moisture amount. A thickener is used to increase viscosity and surface tension.

The formulation procedure for the preparation of the thermoplastic urethane is as follows:

A portion of the polyol is reacted with the MDI, yielding a prepolymer with an NCO of 21.6%. The remaining base polyol is compounded with the rest of the materials to form the resin side of the compound. The components are mixed together as to have a deficiency of NCO per OH (0.67/1 ratio). The remaining OH terminals are tied up using the silicone. When reacted to its full state, the compound exhibits thermoplastic physicals so that, when the material is heated to approximately 180° to 200° F, it becomes very pliable and soft. When cooled to room temperature, it achieves its original hardness and conforms to whatever shape it is formed into while hot. This process can be repeated an infinite number of times with the same results.

A typical and suitable thermoplastic formulation for the thermoplastic resin is set forth in Table I.

TABLE I

| THERMOPLASTIC COMPOUND | | |
|---|---|---|
| A Side | | |
| Mondur MR (a crude MDI mixture from Mobay Chemical Co.) | % 27.48 | Mix Ratio 1/1.58 NCO/OH Ratio .67/1 |
| Multranol M-3900 (a polyether propylene polyol from Mobay Chemical Co.) | 11.27 | |
| A side total | 38.75 | |
| Multranol M-3900 | 7.75 | |
| Isonol C-100 (hydroxy-propyl aniline polyol | 20.15 | |
| Niax LS-490 (a sorbitol-based rigid polyol from Union Carbide Co.) | 7.75 | |
| Dioctyl Phthalate | 3.38 | |
| L-5340 Silicone (dimethyl polysiloxane liquid) | 1.17 | |
| Linde Molecular Sieves No. 4A | 1.17 | |
| A clay filler | 19.38 | |
| B side total | 61.25 | |
| System total | 100.00 | |

The flexible urethane elastomeric resin comprises a styrene-capped polymer polyol having an OH of 28 as the base polyol. Cross-linking is achieved by the use of a hydroxypropyl aniline polyol. Nickel acetylacetonate dispersed in xylene is the reaction catalyst, along with dibutyl tin diacetate. 2,4, pentanedione is used to keep the reaction under control and insure correct molecule configuration. A silicone is used for a slick appearance. TXIB plasticizer is used to soften the compound. Fire retardancy is achieved by the use of alumina trihydrate as a filler.

A typical and suitable flexible urethane elastomeric resin formulation is set forth in Table II.

TABLE II

| PROPOSED ELASTOMER SECONDARY (SUBJECT TO CHANGE) | | |
|---|---|---|
| A Side | % | Mix Ratio 1/11 |
| Mondur MR | 8.31 | NCO/OH Ratio .9/1 |
| A Side total | 8.31 | |
| B Side | | |
| Niax 34-28 (styrene-capped polymer polyol | 39.39 | |
| Isonol C-100 (hydroxy-propyl aniline polyol | 4.38 | |
| LC-5613 catalyst (nickel acetylacetonate in xylene.) | .44 | |
| Dibutyl Tin Diacetate (organotin catalyst) | .004 | |
| 2,4, pentanedione | .44 | |
| No. 4A molecular sieves | .88 | |
| L-5340 silicone (dimethyl polysiloxane liquid) | .21 | |
| TXIB (a plasticizer 1,1,3 trimethyl 2,4, pentanedione diisobutyrate) | 2.19 | |
| Alumina trihydrate (flame retardant) | 43.76 | |
| B Side | 19.694 | |
| System total | 100.004 | |

Our laminate product particularly prepared with a unique thermoplastic urethane resin composition and the molded automobile mats prepared therefrom have many advantages often in their production and have generic qualities over those prior art products and mats. Our invention is described for the purpose of illustration only in certain specific embodiments; however, it is recognized that, within the spirit and scope of our invention, various changes and modifications may be made therein by a person skilled in the art without departing from the scope and spirit of our invention.

What we claim is:

1. A moldable automobile mat, which mat comprises:
   a. a tufted carpet having a tufted face surface and a back surface;
   b. a thin layer of a stiff, heat-moldable thermoplastic urethane resin having a thickness of up to about one-eighth of an inch, the layer bonded to the back surface of the carpet to secure the tufts to the carpet; and
   c. a thick layer of a flexible, cross-linked, thermoset, elastomeric urethane resin secured to the stiff thermoplastic urethane resin layer, the elastomeric layer having a thickness from about one-eighth of an inch to about three-eighths of an inch.

2. The mat of claim 1 wherein the thermoplastic resin layer is heat-moldable within a temperature range of about 150° to 200° F.

3. The mat of claim 1 wherein the thermoplastic resin layer has a thickness of about one-sixteenth to one thirty-second of an inch.

4. The mat of claim 1 wherein the thermoplastic resin layer comprises the urethane reaction product of polyphenyl methylene diisocyanate, a polyol and a polysiloxane compound, the ratio of isocyanate to the hydroxyl group being about 0.67/1.

5. The mat of claim 1 wherein the thermoplastic resin layer is obtained from a urethane composition which consists essentially of a polyphenyl methylene diisocyanate, a polyol with a functionality of two or three, a water-scavenging agent and a dimethyl, polysiloxane compound, the isocyanate (NCO) to free hydroxyl (OH) group ratio NCO/OH being about 0.67, with the siloxane compound reacted with the free hydroxyl groups.

6. The mat of claim 1 wherein the thermoset elastomeric urethane resin is a foam layer having a density of greater than about 25 pcf.

7. The mat of claim 1 wherein the elastomeric urethane layer has a thickness of from about one-eighth to three-sixteenths of an inch.

8. The mat of claim 1 which has been molded to a contour to fit the floor of an automobile in which the mat is to be installed.

9. A moldable automobile mat, which mat comprises:

a. a tufted carpet having a tufted face surface and a back surface;

b. a thin layer of a stiff, heat-moldable thermoplastic urethane resin having a thickness of up to about one-sixteenth to one-thirty-second of an inch, which layer is obtained from a urethane composition which consists essentially of a polyphenyl methylene diisocyanate, a polyol with a functionality of two or three, a water-scavenging agent and a dimethyl, polysiloxane compound, the isocyanate (NCO) to free hydroxyl (OH) group ratio (NCO/OH) being about 0.67, with the siloxane compound reacted with the hydroxyl groups, the layer bonded to the back surface of the carpet to secure the tufts to the carpet; and c. a thick layer of a flexible, cross-linked, thermoset, elastomeric urethane resin secured to the stiff thermoplastic urethane resin layer, the elastomeric layer having a thickness of from about one-eighth of an inch to about three-eighths of an inch.

10. A method of preparing a moldable carpet mat, which method comprises:

a. coating a thin layer of a thermoplastic urethane resin onto the back surface of a tufted carpet material, the first layer coated to a thickness of up to about one-eighth of an inch;

b. coating a thick layer of a flexible, cross-linkable urethane elastomer onto the first coating of the thermoplastic urethane resin, the second layer having a coating thickness of from up to three-eighths of an inch;

c. heating the first and second layers to form a second flexible elastomeric resin coating layer and a stiff, thermoplastic first resin layer;

d. cooling the first and second layers to form a stiff laminate product; and e. cutting the stiff laminate product either before or after the cooling step to a desired size to fit the floor of an automobile in which the mat is to be installed.

11. The method of claim 10 which includes the steps of:

a. heating the cut laminate product to a temperature sufficient to soften the stiff thermoplastic urethane resin layer; and b. molding the laminate product in a mold to a desired form to fit the floor shape of an automobile in which the mat is to be installed.

12. The method of claim 10 wherein the second elastomeric urethane layer is a foam layer having a foam density of greater than about 25 pounds to 50 pcf.

13. The method of claim 10 wherein the second elastomeric urethane layer is a solid elastomeric resin layer.

14. The method of claim 10 wherein the thermoplastic resin layer has a thickness of from about one-sixteenth to one-thirty-second of an inch.

15. The method of claim 10 wherein the thermoplastic resin layer comprises the urethane reaction product of polyphenyl methylene diisocyanate, a polyol and a polysiloxane compound, the ratio of isocyanate to the hydroxyl group being about 0.67/1.

16. The method of claim 10 wherein the thermoplastic resin layer is obtained from a urethane composition which consists essentially of a polyphenyl methylene diisocyanate, a polyol with a functionality of two or three, a water-scavenging agent and a dimethyl, polysiloxane compound, the isocyanate (NCO) to free hydroxyl (OH) group ratio (NCO/OH) being about 0.67, with the siloxane compound reacted with the free hydroxyl groups.

17. The method of claim 10 which includes heating the cut laminate to a temperature of about 150° to 200° F and molding the heated laminate under pressure into a contoured automobile mat.

* * * * *